US012655034B2

(12) United States Patent
Lacadena et al.

(10) Patent No.: US 12,655,034 B2
(45) Date of Patent: Jun. 16, 2026

(54) PROCESS FOR MANUFACTURING NICKEL SULPHATE

(71) Applicant: Solvay SA, Brussels (BE)

(72) Inventors: Maria Jose Lacadena, Schaerbeek (BE); Alun Pryce James, Liverpool (GB)

(73) Assignee: Solvay SA, Brussels (BE)

( * ) Notice: Subject to any disclaimer, the term of this patent is extended or adjusted under 35 U.S.C. 154(b) by 935 days.

(21) Appl. No.: 17/780,783

(22) PCT Filed: Nov. 27, 2020

(86) PCT No.: PCT/EP2020/083635
§ 371 (c)(1),
(2) Date: May 27, 2022

(87) PCT Pub. No.: WO2021/105365
PCT Pub. Date: Jun. 3, 2021

(65) Prior Publication Data
US 2022/0411280 A1 Dec. 29, 2022

(30) Foreign Application Priority Data

Nov. 27, 2019 (EP) .................................... 19211876

(51) Int. Cl.
*C01G 53/10* (2006.01)
(52) U.S. Cl.
CPC .................................... *C01G 53/10* (2013.01)
(58) Field of Classification Search
CPC ................................. C01G 53/10; Y02E 60/10
See application file for complete search history.

(56) References Cited

FOREIGN PATENT DOCUMENTS

CN 107739059 A 2/2018
CN 108423716 A * 8/2018 ............. C01G 53/10

OTHER PUBLICATIONS

Li et al. (Ultrasound augmented leaching of nickel sulfate in sulfuric acid and hydrogen peroxide media, Ultrasonics Sonochemistry, 2018) (Year: 2018).*
Yale Environmental Health and Safety (Piranha Solution) (Year: 2025).*
Paul et al. (Handbook of Industrial Mixing, Wiley-Interscience, Chapter 13-2.4) (Year: 2004).*
ECHA Chem (Nickel Sulfate) (Year: 2025).*
Machine translation of CN-108423716-A (Year: 2018).*

(Continued)

*Primary Examiner* — Anthony J Zimmer
*Assistant Examiner* — Logan Laclair
(74) *Attorney, Agent, or Firm* — Osha Bergman Watanabe & Burton LLP

(57) ABSTRACT

A process for manufacturing nickel sulphate by leaching metal particles comprising nickel in an aqueous sulphuric acid solution, said process comprising the steps of:
  introducing the metal particles in the aqueous sulphuric acid solution
  introducing an aqueous hydrogen peroxide solution in the aqueous sulphuric acid solution containing the metal particles
wherein the aqueous hydrogen peroxide solution is introduced progressively into the aqueous sulphuric acid solution containing the metal particles.

21 Claims, 8 Drawing Sheets

(56)     References Cited

OTHER PUBLICATIONS

Randhawa Navneet Singh Gharami Kalpataru Kumar Manoj, Leaching kinetics of spent nickel-cadmium battery in sulphuric acid, Hydrometallurgy, Sep. 18, 2015 Elsevier Scientific Publishing CY. Amsterdam, NL, vol. 165,pp. 191-198 (8 pages).

Haoyu Li, Shiwei Li, Jinhui Peng, Chandrasekar Srinivasakannan, Libo Zhang, Shaohua Yin, Ultrasound augmented leaching of nickel sulfate in sulfuric acid and hydrogen peroxide media, Ulrasonics Sonochemistry, Jan. 1, 2018 Butterworth-Heinemann, GB, vol. 40,pp. 1021-1030 (10 pages).

Rabah M A, Farghaly F E, Abd-El Motaleb M A, Recovery of nickel, cobalt and some salts from spent Ni-MH batteries, Waste Management, Jan. 1, 2008 Elsevier, New York, NY, US, vol. 28,Nr:7,pp. 1159-1167 (9 pages).

International Search Report issued in International Application No. PCT/EP2020/083635, mailed Feb. 4, 2021 (4 pages).

Written Opinion issued in International Application No. PCT/EP2020/083635, mailed Feb. 4, 2021 (8 pages).

* cited by examiner

PROCESS FOR MANUFACTURING NICKEL SULPHATE

CROSS-REFERENCE TO RELATED APPLICATIONS

This application is a National Stage Entry of International Patent Application No. PCT/EP2020/083635, filed on Nov. 27, 2020, which claims priority to European Patent Application No. 19211876.8 filed on 27 Nov. 2019 in Europe, the whole contents of which are incorporated herein by reference for all purposes.

DETAILED DESCRIPTION

Figure 1:
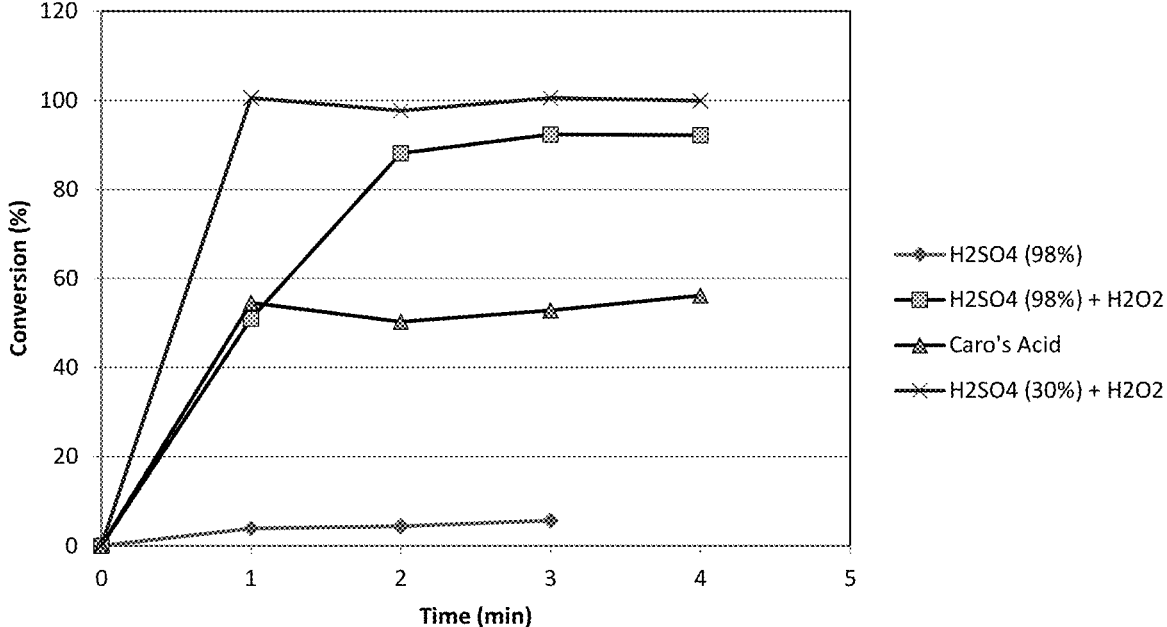
FIG. 1 shows plots of conversion over time, according to embodiments of the present disclosure.

The present invention relates to a process for manufacturing nickel sulphate.

Nowadays, there is a growing number of electric vehicles (EV). The current predominant battery energy storage technology for EVs is the Li-ion battery (LIB). In a LIB lithium ions move from the negative electrode or anode (principally made from carbon e.g. graphite) through an electrolyte to the positive electrode (cathode) during discharge, and back when charging.

Chemistry, performance, cost and safety characteristics vary across LIB types. Handheld electronics mostly use lithium polymer batteries (with a polymer gel as electrolyte) with lithium cobalt oxide (LiCoO2) as cathode material, which offers high energy density but presents safety risks, especially when damaged. Lithium iron phosphate (LiFePO4), lithium ion manganese oxide battery (LiMn2O4, Li2MnO3, or LMO), and lithium nickel manganese cobalt oxide (LiNiMnCoO2 or NMC) offer lower energy density but longer lives and less likelihood of fire or explosion. NMC in particular is the leader for automotive applications i.e. for EV. The cathode used in NMC batteries is a combination of nickel:manganese:cobalt for instance in a weight ratio 8:1:1 hence called NMC 811).

Even though much more nickel will be needed in a near future to satisfy the demand for LIBs, most nickel in the global supply chain is not actually suited for battery production. Battery demand requires high grade nickel products to produce nickel sulphate and currently, less than 10% of nickel supply is in sulphate form. Hence, there is a need to capture the rising demand for nickel sulphate and a lot of research is going on in this field.

Current processes for the production of nickel sulphate (NiSO4) involve dissolving nickel powder in sulphuric acid (H2SO4) to produce a nickel sulphate aqueous solution and hydrogen gas according to the following reaction:

$$Ni+H2SO4\rightarrow NiSO4+H2$$

However there are two main concerns:
the volatility of hydrogen gas, that creates a hazardous environment; and
the low kinetics of the reaction, due to the passivation layer formed (NiOOH), that hinders further dissolution.

To solve these problems, it has been proposed to add hydrogen peroxide according to the following reaction scheme:

$$Ni+H2O2+H2SO4\rightarrow NiSO4+2\ H2O.$$

It was namely found that the addition of hydrogen peroxide removes the passive layer and activates the nickel surface.

In the article entitled "Ultrasound augmented leaching of nickel sulfate in sulfuric acid and hydrogen peroxide media"-Ultrason Sonochem. 2018 Jan, a block of Ni (2 cm×1 cm×1 cm) was partially dissolved in 90 ml of a 30% aqueous sulphuric acid solution to which 10 ml of a 30% aqueous hydrogen peroxide solution was added every hour, and the conversion reached was 60.41% after 5 hours using ultrasound. The industrialization of such a process would hence require high volumes of solutions and higher reaction times.

The present invention aims at providing a leaching process with an increased efficiency, having an improved conversion in a shorter reaction time, using less reagents and providing as final product a highly concentrated solution of metal sulphate with a low acidic residue.

To this end, the present invention concerns a process for manufacturing nickel sulphate by leaching metal particles comprising nickel in an aqueous sulphuric acid solution, said process comprising the steps of:
introducing the metal particles in the aqueous sulphuric acid solution
introducing an aqueous hydrogen peroxide solution in the aqueous sulphuric acid solution containing the metal particles
wherein the aqueous hydrogen peroxide solution is introduced progressively into the aqueous sulphuric acid solution containing the metal particles.

In the frame of the invention, the term "particles" intends to designate a particulate solid having a mean particle size ranging from the microns to the centimetres, and which may have any shape (powder, pellets, briquettes etc.).

From a chemical point of view, a powder may be preferred (hence, with a particle size in the range of the microns to the mm, typically between 150 μm and 5 mm) in order to have a high surface to volume ratio but from an industrial point of view, pellets or briquettes might be easier to handle. These typically have dimensions in the range of the mm to the cm, typically between 10 and about 50 mm.

The terms "metal particles comprising nickel" intend to designate either substantially pure Ni particles, particles of a substantially pure alloy comprising Ni or a mixture of substantially pure Ni particles with substantially pure particles of at least one other metal, for instance particles resulting from the recycling of a used NMC cathode and hence, also comprising Co and Mn.

By the term "substantially pure" is meant containing less than 2 wt % impurities (i.e. compounds from another chemical nature), preferably less than 1 wt % impurities.

As to the mixture of Ni particles with particles of at least one other metal and to particles of a substantially pure alloy comprising Ni, these generally contain at least 60 wt % of Ni, preferably at least 70 wt % of Ni and even more preferably, 80 wt % of Ni or more.

As to the at least one other metal in the mixture of particles or in the alloy, it is preferably chosen between Co and Mn and more preferably, it is a mixture of both. It is namely so that the result of the process of the invention will then be a mixed sulphate of Ni, Co and Mn and hence, directly the mixed metal sulphate that will be used by cathode manufacturers. In this embodiment, the mixed metal source may be originating from used batteries hence, comprise Ni:Mn:Co in a weight ratio from about 1:1:1 to about 8:1:1, values close to the latter being preferred.

The aqueous sulphuric acid solution used in the process of the invention generally has a concentration of 10 wt % or more, preferably of 20 wt % or more, more preferably of 30 wt % or more. It generally has a concentration of 60 wt % or less, preferably of 50 wt % or less or even 35 wt % or less. The Applicant has namely found that if a highly concentrated solution of sulphuric acid is used, $NiSO_4$ monohydrate is formed, which is less soluble in water. In practice, good results are obtained with an aqueous sulphuric acid solution having a concentration between 20 wt % and 35 wt %. Actually, on powder, concentrations from 20 wt % to 40 wt % work quite well, while for briquettes, concentrations of 20 wt % to 30 wt % are preferred.

The aqueous hydrogen peroxide solution used in the process of the invention preferably has a concentration of 20 wt % or more, more preferably of 30 wt % or more. It generally has a concentration of 60 wt % or less, preferably of 50 wt % or less or even 35 wt % or less. In practice, good results are obtained with an aqueous hydrogen peroxide solution having a concentration between 30 wt % and 60 wt %.

The starting materials used (both the aqueous sulphuric acid solution and the aqueous hydrogen peroxide solution) may of course be more concentrated i.e. typically 96 wt % for $H_2SO_4$ and up to 70 wt % for $H_2O_2$.

In fact, the concentration of the reactive chemical species used in the process of the invention are linked. Ideally, it would be advantageous to use amounts of Ni, $H_2SO_4$ and $H_2O_2$ as close as possible to their stoichiometric amounts (which hence means a molar ratio Ni:$H_2SO_4$:$H_2O_2$ about 1:1:1: see the reaction scheme above). However, since in practice it is difficult or even impossible to avoid some $H_2O_2$ decomposition (unless by adjusting the dosing rate and/or with a small excess of sulphuric acid), the amount of $H_2O_2$ used will generally be slightly higher, for instance of at least 5% (i.e. 1.05 mole vs 1 mole of the other species), generally at least 10% and even higher, compared to the molar amount of the other species. The inventors namely found out that in practice, good results can be obtained with a molar ratio Ni:$H_2SO_4$:$H_2O_2$ between 1:1:1.3 and 1:1:1.1, typically equal to 1:1:1.2.

In a preferred embodiment, a molar excess of $H_2SO_4$:Ni may be used. In practice, good results were obtained with a molar ratio $H_2SO_4$:Ni of 1.1:1 and in particular, with a molar ratio Ni:$H_2SO_4$:$H_2O_2$ of 1:1.1:1.2.

As to the water, it is preferably present in an amount sufficient to solubilize the obtained $NiSO_4$ i.e. in an amount at least equal to amount required to get an aqueous solution saturated in $NiSO_4$ throughout the process including the cooling down of the solution to room temperature. Preferably, a slight excess of water is used in order to ensure that the final $NiSO_4$ concentration is close to but still below saturation. In practice, good results are obtained with a final $NiSO_4$ concentration between 80% and 90% of its molar concentration at saturation at room temperature. Values of $NiSO_4$ solutions at saturation in function of temperature can for instance be found in the article by P. M. Kobylin et al./CALPHAD: Computer Coupling of Phase Diagrams and Thermochemistry 40 (2013) 41-47. At room temperature for instance, it is about 2.5 mol/kg so that the above amounts correspond to between 2 mol/kg and 2.25 mol/kg of $NiSO_4$. In practice, good results were obtained with an amount of water such that the final solution contained 2.13 mol/kg of $NiSO_4$ at the end of reaction i.e. at a temperature of about 67° C. Actually, some $NiSO_4$ crystalized upon cooling so that the final concentration in the solution was then 1.8 mol/kg at room temperature (with 30% sulphuric acid, max. temperature 66.9° C. at the end of the reaction.

However, in some embodiments, it is preferred to work in supersaturated conditions in order to crystallize $NiSO_4$ in situ, directly during the process of the invention, i.e. at the end of it actually. Those skilled in the art can easily determine the amount of sulphuric acid required to reach such conditions.

Generally, all the water is introduced via the $H_2SO_4$ and the $H_2O_2$ solutions. As far as the $H_2SO_4$ is concerned, it may be diluted to the desired concentration in situ i.e. water can be added to a more concentrated solution present in the leaching vessel prior to the addition of $H_2O_2$.

A key aspect of the present invention is the progressive introduction of the aqueous hydrogen peroxide solution into the sulphuric acid solution containing the metal particles. By the term 'progressive' is meant either in small increments (preferably of at most 1% in weight of the total amount of hydrogen peroxide to be introduced), preferably evenly timed over a given period of time, or in a continuous stream. In both cases, it is preferably at such a rate that the total period of introduction of the hydrogen peroxide solution is preferably at least 1 hour and particularly in the range of 1 to 6 hours often 1 to 4 hours in the case of a batch process. On an industrial scale, it is preferable to optimize this duration (of introduction of the hydrogen peroxide solution) taking into account what is feasible in terms of flow rates, economics and also, in function of the size of the metal particles.

The extent to which the introduction of the hydrogen peroxide solution is progressive can easily be optimized by those skilled in the art by performing a limited amount of trials and measuring the evolution of the degree of leaching (for instance by measuring the amount of dissolved Ni by Atomic Spectrometry (ICP-OES) on samples regularly taken from the leaching medium).

The applicant has found that results continue to improve as the incremental method approximates more closely to continuous additions. Thus, the more frequent addition of increments of less than 1% of the total amount of hydrogen peroxide is preferred. In a preferred embodiment, the process of the invention takes place in a vessel and increments of less than 1% of the total amount of hydrogen peroxide to be added are introduced at the same time in different locations of the vessel.

Alternatively, a small continuous stream (or several simultaneous small streams in different locations of the leaching vessel) might also be used.

In a preferred embodiment of the invention, the introduction of hydrogen peroxide into the sulphuric acid solution containing the metal particles starts as soon as possible, e.g. within a few seconds or minutes after the metal particles are contacted with the sulphuric acid solution. This embodiment allows increasing the speed of leaching by preventing the passivation layer to grow on the metal particles.

In another preferred embodiment of the invention, at least part of the hydrogen peroxide is introduced in the leaching vessel simultaneously with at least part of the sulphuric acid. This embodiment actually offers the advantage of being able to start the leaching earlier or immediately and to prevent the passive layer from forming.

In any event, the hydrogen peroxide introduction into the leaching vessel preferably starts before a substantial amount of hydrogen is generated, in particular: before the explosive concentration of hydrogen is reached in the gas phase of/above the leaching vessel.

The starting pH of the leaching medium of the process of the invention is generally below 1, typically about 0.5 and at the end of the introduction of the required amount of hydrogen peroxide, this pH is generally still below 3 and even typically below 2.

Preferably, in the process of the invention, the aqueous solution of sulphuric acid is stirred or otherwise agitated under mechanical conditions throughout the period of introduction of the aqueous hydrogen peroxide solution. One advantage of doing so is to minimise, as far as possible, local variations of temperature from the introduction of the hydrogen peroxide, since such variations tend to lead to an impaired performance, which manifests itself by way of increased hydrogen peroxide demand, or a higher residual level of undissolved Ni.

Preferably, the metal particles are substantially (and preferably completely) dissolved at the end of the introduction of the hydrogen peroxide solution (also called leaching step).

As to the leaching temperature in the process of the invention, it is preferably from 0° C. to 100° C., more preferably from 50 to 85° C., even more preferably from 60 to 80° C., temperatures from 65 to 75° C. giving good results in practice. Depending on the reaction conditions, the heat of reaction may be enough to reach the required temperature without additional heating.

The leaching can be done at atmospheric pressure or under a pressure of up to 10 bar with the addition of nitrogen, oxygen or air. In the presence of oxygen or air under pressure, lower (sub-stoichiometric) amounts of H2O2 might be used since the oxygen could carry out part of the oxidation.

In both industrial process modes (batch or continuous), the aqueous hydrogen peroxide solution is introduced in the aqueous sulphuric acid solution as close as possible and preferably onto the metal particles.

Ultrasounds may be used during the introduction of the aqueous hydrogen peroxide solution in the aqueous sulphuric acid solution to assist leaching, especially with big size particles.

After the introduction of the aqueous hydrogen peroxide solution in the aqueous sulphuric acid solution, the resulting NiSO4 solution is generally brought or kept at atmospheric pressure and cooled down to room temperature before being eventually being further processed to isolate the NiSO4 produced, for example by crystallisation. However, the pure NiSO4 solution obtained by the process of the invention can also be used directly as a feed material for the production of the cathode material.

Some preferred embodiments of the invention will be illustrated through the Examples below.

EXAMPLE 1

Materials Used
  Ni powder of a particle size 75-100 μm and a purity of 99.8%
  H2SO4 aqueous solution 98 wt %
  H2O2 aqueous solution with a concentration of 48.5 wt %
  Caro's acid prepared with a molar ratio of H2SO4:H2O2 of 2.5
Experimental Conditions
  Ni powder, H2SO4 and additional DMW (the case being) were introduced in the leaching vessel and were ice cooled before the drop wise introduction of the H2O2 solution.
The Reaction Conditions were Thereafter as Follows:
  Temperature: 70° C.
  Reaction time: 4 hours
  Every hour, samples of the reaction medium were taken and analysed for their dissolved Ni content by ICP. The conversion (%) was then calculated in function of said measured dissolved Ni content as follows:

$$\text{Conversion (\%)} = [(\text{Ni max} - \text{Ni measured})/\text{Ni max}] \times 100$$

wherein Ni max is the amount (in grams or moles for instance) of Ni that would be dissolved at 100% conversion.

Experiments 1 to 3

The amounts of reactive species and water used in these experiments are detailed in Table 1 below.

TABLE 1

| Experiment No | Ingredient | mol | g |
|---|---|---|---|
| 1 | Nickel 99.8% | 0.5101 | 30.00 |
| | H2SO4 98% | 0.5101 | 51.05 |
| | H2O2 48.5% | 0.6121 | 42.89 |
| | Water | — | — |
| 2 | Nickel 99.8% | 0.4251 | 25.00 |
| | H2SO4 98% | 0.4251 | 42.54 |
| | H2O2 48.5% | 0.5101 | 35.78 |
| | Water | 5.3528 | 96.43 |
| 3 | Nickel 99.8% | 0.4251 | 25.00 |
| | H2SO4 98% | 0.4251 | 42.54 |
| | H2O2 48.5% | — | — |
| | Water | 5.3649 | 96.65 |

Experiment 1 was performed with a 98 wt % H2SO4 starting solution, while experiments 2 and 3 used a 30 wt % H2SO4 starting solution.

FIG. 1 attached plots the conversion over time for experiment 1 (curve with the squares), experiment 2 (curve with the crosses) and experiment 3 (curve with the diamonds), as well as for an experiment conducted with Caro's acid in the same experimental conditions (curve with the triangles). It is quite clear from this Figure that the combination of H2SO4 30 wt % with H2O2 at a molar ratio H2O2:H2SO4 of 1.2:1 gives much better results, even quite surprisingly better than with H2SO4 98 wt % even in the presence of H2O2 at the same molar ratio.

EXAMPLES 2 TO 4: RESULTS ON NI POWDER

Materials Used:
  Nickel powder (99.8%) with the following granulometry: 90%<138.6 μm, 50%<101.1 μm, 10%<73.7 μm
  Sulphuric acid (98%) from Merck
  Hydrogen peroxide ST50 from Solvay Experimental Procedure:

25 grams of nickel powder were introduced in the reactor with the required amount of sulphuric acid and mixed under mechanical stirring at 500 r.p.m. Once the reactor was closed, the hydrogen peroxide was added progressively, and the temperature of the reaction was recorded. Samples of the solution were taken every 10 minutes and diluted in DMW for the measurement of the dissolved nickel by ICP-OES. The last sample was taken 10 minutes after the last drop of hydrogen peroxide was added.

EXAMPLE 2: INFLUENCE OF THE PEROXIDE DOSING RATE

The hydrogen peroxide was dosed dropwise to the reaction mixture and the temperature was recorded.

Conditions of the Test:

Sulphuric acid: 30%

Hydrogen peroxide: ST50 (50 wt %)

Molar ratio: Stoichiometric

The range of dosing rate selected for the study was between 0.5 and 1.0 ml/min of $H_2O_2$ ST50.

Figure 2:
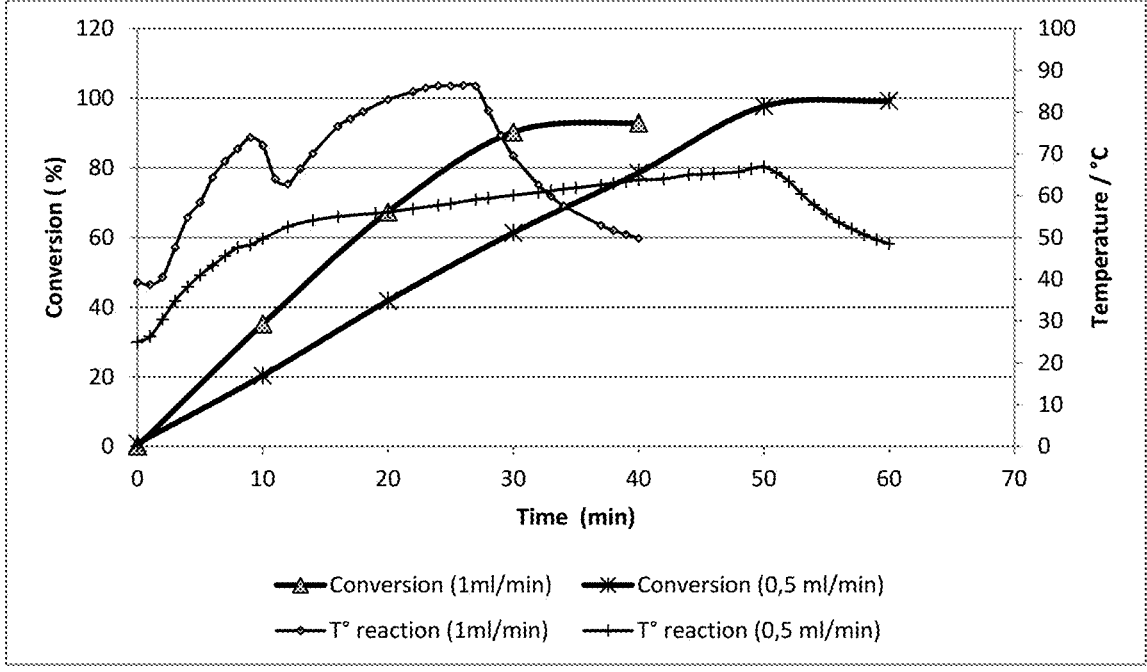
FIG. 2 shows plots of evolution over time of conversion and temperature, according to embodiments of the present disclosure.

The results are plotted in FIG. 2 attached, which namely shows the evolution over time of the conversion (curve with triangles for 1 ml/min and stars for 0.5 ml/min) and of temperature (curve with small diamonds for 1 ml/min and small vertical lines for 0.5 ml/min).

The conversion of nickel powder to nickel (II) drops from 99.2% to 92.8% when the dosing rate increases from 0.5 ml/min to 1 ml/min. The leaching rate increases with the dosing rate; however, the temperature of the reaction increases as well, which might decompose the hydrogen peroxide, especially at temperatures above 80° C., and decrease the efficiency of the hydrogen peroxide. Some bubbles are generated in the leached product due to the unreacted peroxide.

EXAMPLE 3: INFLUENCE OF THE SULPHURIC ACID CONCENTRATION

Conditions:

Hydrogen peroxide: 50%

Molar ratio: Stoichiometric

Peroxide dosing rate: 0.5 ml/min

The selected range of sulphuric acid selected for the study was 30%-40% in weight.

Figure 3:
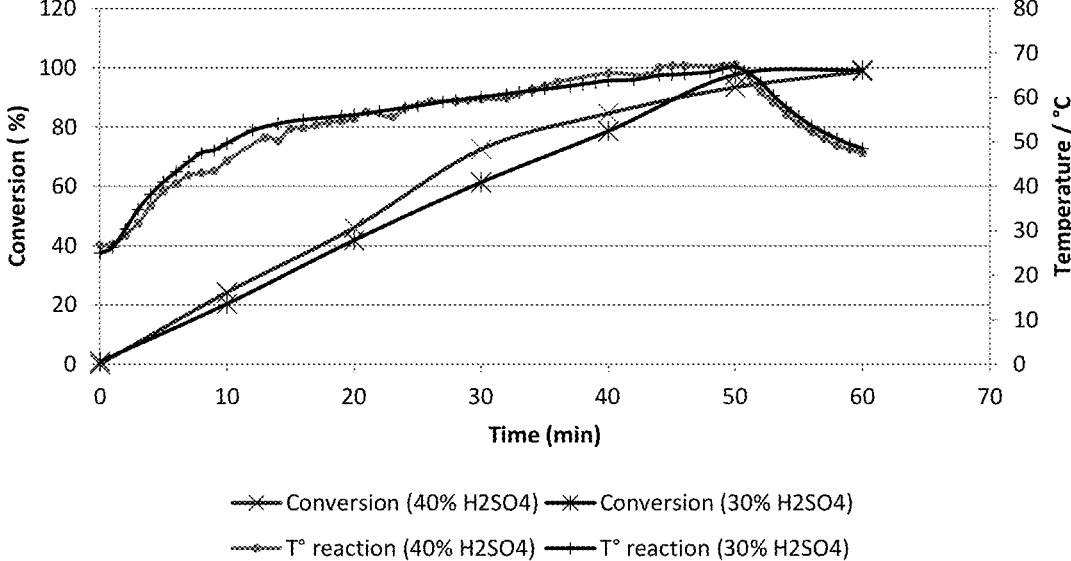
FIG. 3 shows plots of evolution over time of conversion and temperature, according to embodiments of the present disclosure.

The results are plotted in FIG. 3 attached, which namely shows the evolution over time of the conversion (curve with crosses for 40% $H_2SO_4$ and stars for 30% $H_2SO_4$) and of temperature (curve with small dots for 40% $H_2SO_4$ and with small vertical lines for 30% $H_2SO_4$).

The crystalization of nickel sulphate started in the middle of the reaction with 40% sulphuric acid, from minute 30, which made it difficult for the sampling. The temperature profile of the reaction was very similar; hence it is mainly affected by the dosing rate and not the concentration of sulphuric acid.

EXAMPLE 4: INFLUENCE OF THE SULPHURIC ACID MOLAR RATIO

With the aim of increasing the stability of the hydrogen peroxide and improve the performance of the reaction, the addition of a small excess of sulphuric acid was assessed.

Conditions:

Sulphuric acid: 30%

Hydrogen peroxide: 50%

Peroxide dosing rate: 1 ml/min

The amount of excess added was Ni:$H_2SO_4$ 1:1.1 (molar ratio).

Figure 4:
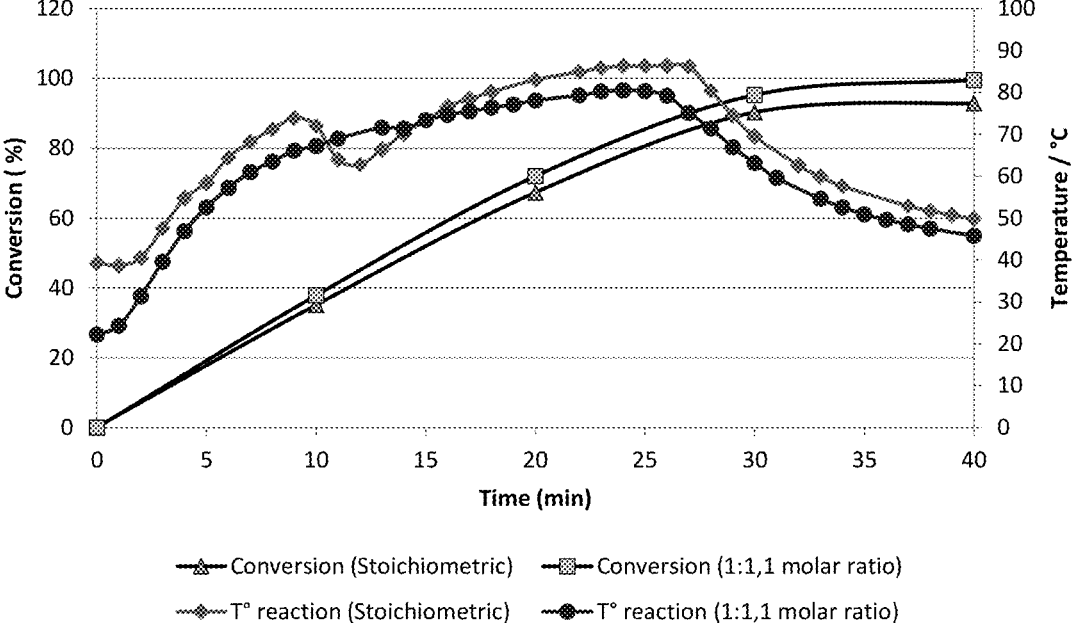
FIG. 4 shows plots of evolution over time of conversion and temperature, according to embodiments of the present disclosure.

The results are plotted in FIG. 4 attached, which namely shows the evolution over time of the conversion (curve with triangles for a stoichiometric ratio and squares for the molar excess) and of temperature (curve with diamonds for a stoichiometric ratio and with dots for the molar excess).

The conversion increased from 92.8% to 99.5% with just the addition of 1.1 excess of molar ratio of $H_2SO_4$. No bubbles were formed in the leached solution.

EXAMPLE 5: INFLUENCE OF PARTICLE SIZE

The Ni Materials Used are:

For the powder: same as in Examples 2 to 4

For the briquettes: Nickel briquettes (99.8%); Size: 4×3×2 cm (weight 93 g-119 g)

Conditions:

Sulphuric acid: 30%

Hydrogen peroxide: 50%

Peroxide dosing rate: 0.5 ml/min

For the powder, the same procedure was followed as in Examples 2 to 4. For the briquettes, due to their size, the tests were performed with one briquette per test and heating to 70° C. was required. The briquette was introduced into a double jacket reactor with the sulphuric acid solution and mixed with a mechanical stirrer at 300 rpm. The reactor was then closed and the peroxide was dosed progressively. Samples were taken every hour for the analysis of Ni (II) by ICP-OES.

The last sample was taken 10 minutes after the last drop of hydrogen peroxide was added.

Figure 5:
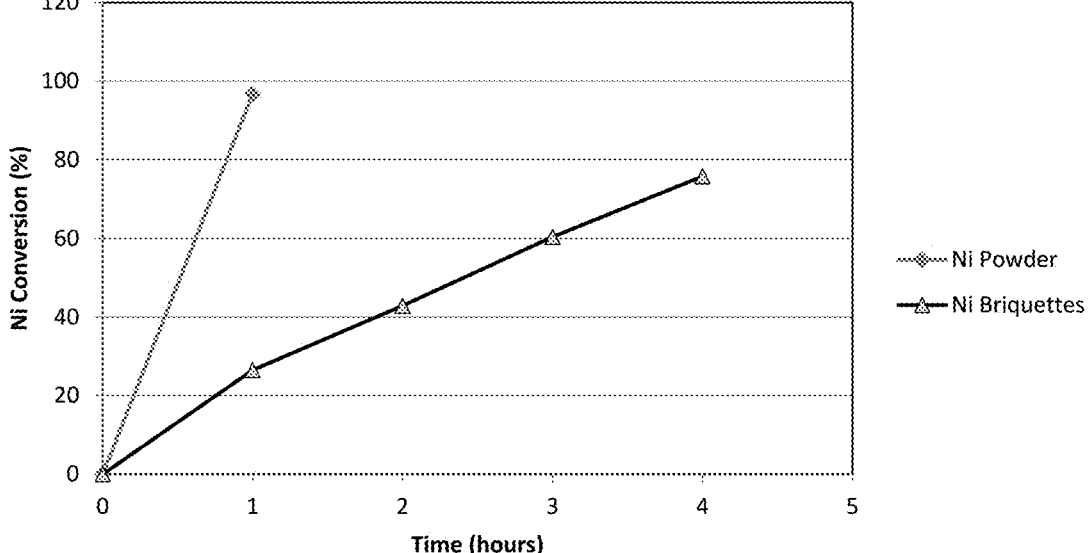
FIG. 5 shows plots of conversion over time, according to embodiments of the present disclosure.

FIG. 5 attached plots the conversion over time for the powder (curve with the diamonds) and briquettes (curve with the triangles).

EXAMPLE 6: EFFICIENCY ON A MIX OF METALS

As the cathode material of batteries is made of the sulphate salt of Ni, Mn and Co in the molar ration (8:1:1), the process of the invention was tested on such a mixture of metals in powder form with a maximal particle size of 45 μm and a purity of about 99.5%.

Conditions:

Peroxide dosing rate: 0.5 ml/min $H_2SO_4$: 30%

Figure 6:
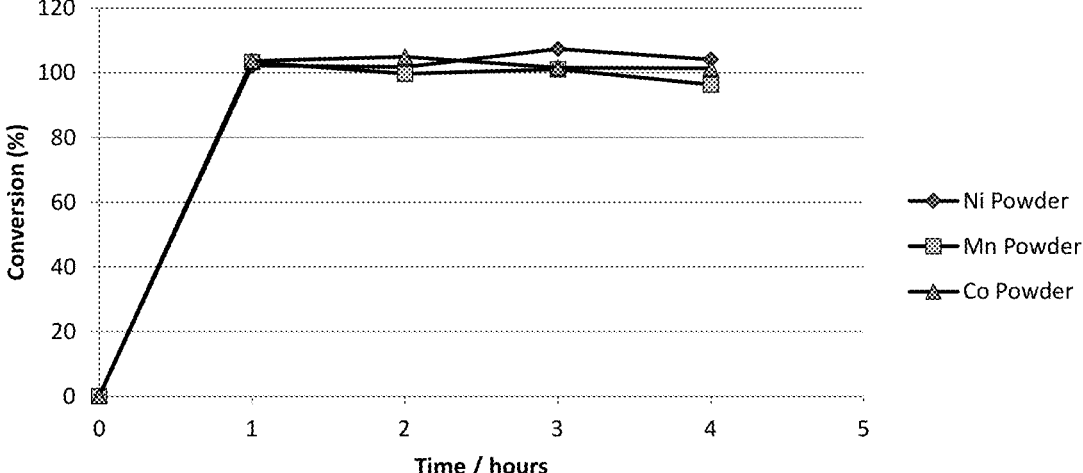
FIG. 6 shows plot of dissolution over time, according to embodiments of the present disclosure.

Results:

100% dissolution of the 3 metals after about 1 hour: see FIG. 6 attached (the diamonds are for Ni, the squares for Mn and the triangles for Co).

EXAMPLE 7: INFLUENCE OF THE DOSING RATE ON BRIQUETTES

Test Conditions:

Sample: Nickel briquettes as in Example 5

[$H_2SO_4$]: 30%

Temperature: 70° C.

Molar ratio: Stoichiometric

Peroxide grade: ST50

Mechanical stirring: 200 RPM

Figure 7:
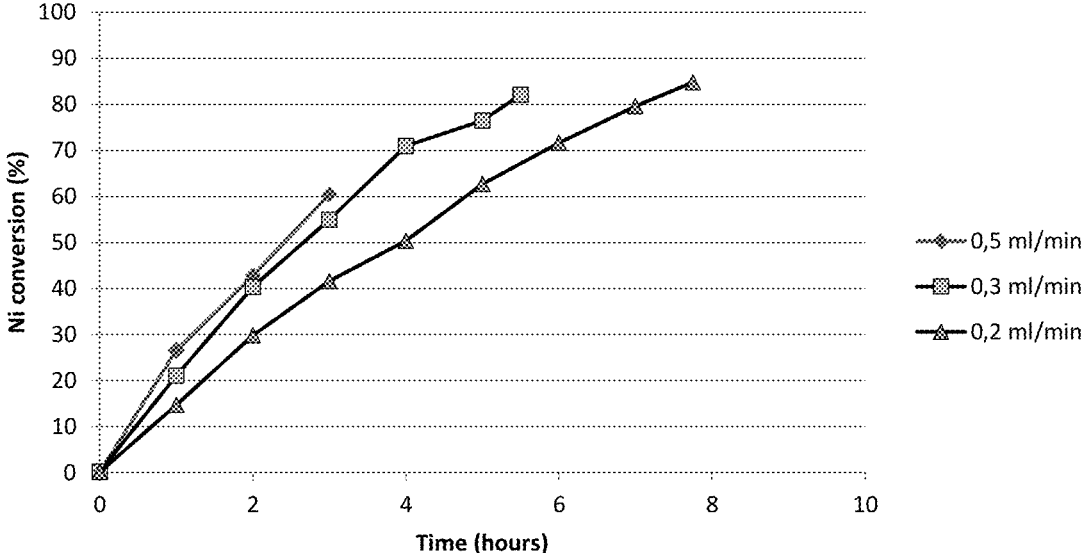
FIG. 7 shows plots of conversion over time, according to embodiments of the present disclosure.

FIG. 7 attached plots the conversion over time for a dosing rate of 0.5 ml/min (curve with the diamonds), 0.3 ml/min (curve with the squares) and 0.2 ml/min (curve with the triangles).

EXAMPLE 8: PROCESS OPTIMIZATION WITH BRIQUETTES

Sample: Nickel briquettes as in Example 5

With the aim of evaluating the impact of each parameter in the process, a design of experiments was performed. The Selected Parameters for the Study were:

Dosing rate (ml/min): 0.3-0.5

Sulphuric acid concentration (%): 24-30

Temperature (° C.): 50-70

Fixed Parameters:

Hydrogen peroxide: 50 wt %

Molar ratio Ni:H2SO4:H2O2 1:1.1:1.2

Mechanical stirring: 300 rpm

The matrix of the tests performed is summarized in Table 1 below.

TABLE 1

| Experiment | DOE1 | DOE2 | DOE3 | DOE4 |
|---|---|---|---|---|
| Temperature (° C.) | 50 | 70 | 70 | 50 |
| Dosing rate (ml/min) | 0.5 | 0.5 | 0.3 | 0.3 |
| H2SO4 (%) | 24 | 30 | 24 | 30 |

Figure 8:
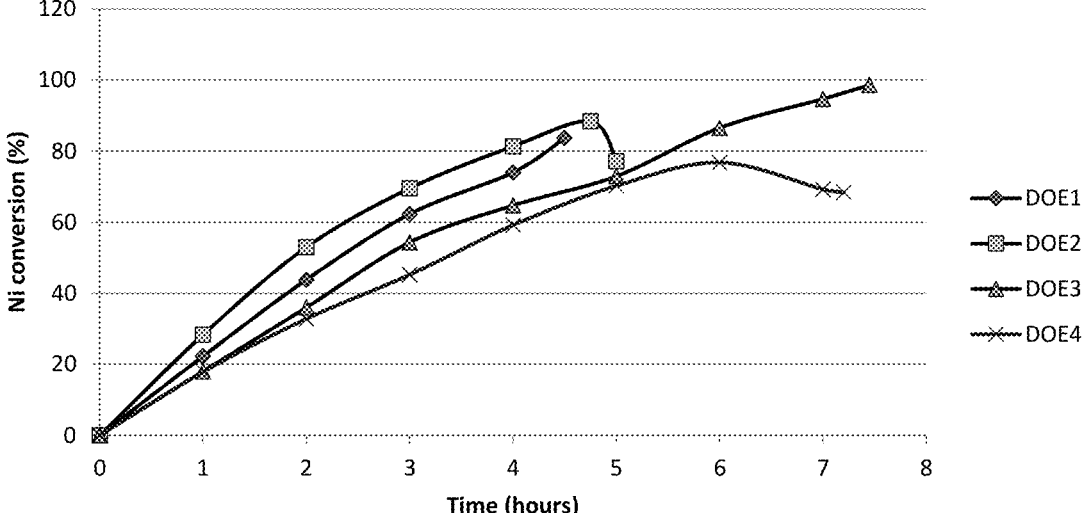
FIG. 8 shows plots of conversion over time, according to embodiments of the present disclosure.

FIG. 8 attached plots the conversion over time for experiment DOE1 (curve with the diamonds), experiment DOE2 (curve with the squares), experiment DOE3 (curve with the triangles), and experiment DOE4 (curve with the crosses). In the conditions of DOE2, there was some NiSO4 precipitation at the end of the experiment.

Should the disclosure of any patents, patent applications, and publications which are incorporated herein by reference conflict with the description of the present application to the extent that it may render a term unclear, the present description shall take precedence.

The invention claimed is:

1. A process for manufacturing nickel sulphate by leaching metal particles comprising nickel in an aqueous sulphuric acid solution, said process comprising the steps of:

introducing the metal particles in the aqueous sulphuric acid solution; and introducing an aqueous hydrogen peroxide solution in the aqueous sulphuric acid solution containing the metal particles;

wherein the aqueous hydrogen peroxide solution is introduced progressively into the aqueous sulphuric acid solution containing the metal particles, wherein the aqueous sulphuric acid solution has a concentration of 60 wt % or less, and wherein the aqueous hydrogen peroxide solution is introduced by increments of less than 1% of a total amount of hydrogen peroxide to be added into the aqueous sulphuric acid solution containing the metal particles.

2. The process according to claim 1, wherein the aqueous sulphuric acid solution has a concentration between 20 wt % and 35 wt %.

3. The process according to claim 1, wherein the aqueous hydrogen peroxide solution has a concentration between 30 wt % and 60 wt %.

4. The process according to claim 1, wherein the molar ratio $Ni:H_2SO_4:H_2O_2$ is between 1:1:1.3 and 1:1:1.1.

5. The process according to claim 1, wherein the molar ratio $Ni:H_2SO_4:H_2O_2$ is 1:1.1:1.2.

6. The process according to claim 1, wherein the final $NiSO_4$ concentration of the aqueous sulphuric acid solution is between 80% and 90% of the molar concentration of NiSO4 at saturation at room temperature.

7. The process according to claim 1, wherein the process takes place in a vessel and wherein increments of less than 1% of the total amount of hydrogen peroxide to be added are introduced at the same time in different locations of the vessel.

8. The process according to claim 1, wherein the introduction of hydrogen peroxide into the sulphuric acid solution containing the metal particles starts within a few seconds or minutes after the metal particles are contacted with the sulphuric acid solution.

9. The process according to claim 1, wherein the hydrogen peroxide is introduced in a leaching vessel simultaneously with at least part of the sulphuric acid.

10. The process according to claim 1, wherein the hydrogen peroxide introduction starts before the explosive concentration of hydrogen is reached in the gas phase of/above a leaching vessel.

11. The process according to claim 1, wherein the pH of the aqueous sulphuric acid solution before the introduction of hydrogen peroxide is below 1 and wherein the pH of the aqueous sulphuric acid solution at the end of the introduction of the total amount of hydrogen peroxide is below 3.

12. The process according to claim 1, wherein the aqueous solution of sulphuric acid is stirred or otherwise agitated under mechanical conditions throughout the introduction of the aqueous hydrogen peroxide solution.

13. The process according to claim 1, wherein the metal particles are substantially dissolved at the end of the introduction of the aqueous hydrogen peroxide solution into the aqueous sulphuric acid solution.

14. The process according to claim 1, wherein the introduction of the aqueous hydrogen peroxide solution takes place at temperatures from 65 to 75° C.

15. The process according to claim 1, wherein the process takes place under a pressure of oxygen or air.

16. The process according to claim 1, wherein the aqueous hydrogen peroxide solution is introduced in the aqueous sulphuric acid solution as close as possible to the metal particles.

17. The process according to claim 1, wherein ultrasounds are used during the introduction of the aqueous hydrogen peroxide solution in the aqueous sulphuric acid solution.

18. The process according to claim 1, wherein after the introduction of the aqueous hydrogen peroxide solution in the aqueous sulphuric acid solution, the resulting NiSO4 solution is brought or kept at atmospheric pressure and cooled down to room temperature before being further processed to isolate the NiSO4 produced, or before being used as a feed material for the production of cathode material.

19. The process according to claim 1, wherein the aqueous sulphuric acid solution has a concentration of 50 wt % or less.

20. The process according to claim 1, wherein the aqueous sulphuric acid solution has a concentration of 35 wt % or less.

21. A process for manufacturing nickel sulphate by leaching metal particles comprising nickel in an aqueous sulphuric acid solution, said process comprising the steps of:

introducing the metal particles in the aqueous sulphuric acid solution; and introducing an aqueous hydrogen peroxide solution in the aqueous sulphuric acid solution containing the metal particles, wherein the aqueous hydrogen peroxide solution is introduced in the aqueous sulphuric acid solution containing the metal particles in the absence of ultrasounds, and wherein the aqueous hydrogen peroxide solution is introduced progressively into the aqueous sulphuric acid solution containing the metal particles and the aqueous sulphuric acid solution has a concentration of 50 wt % or less, and wherein the aqueous hydrogen peroxide solution is introduced by increments of less than 1% of a total amount of hydrogen peroxide to be added into the aqueous sulphuric acid solution containing the metal particles.

* * * * *